Jan. 9, 1923.

H. W. WILLIAMS.

DISPENSING MACHINE.

ORIGINAL FILED APR. 26, 1921.

Re. 15,527.

6 SHEETS—SHEET 1.

Inventor

H. W. WILLIAMS.

By Edward Reid.

Attorney

Jan. 9, 1923.
H. W. WILLIAMS.
DISPENSING MACHINE.
ORIGINAL FILED APR. 26, 1921.
Re. 15,527.
6 SHEETS—SHEET 2.
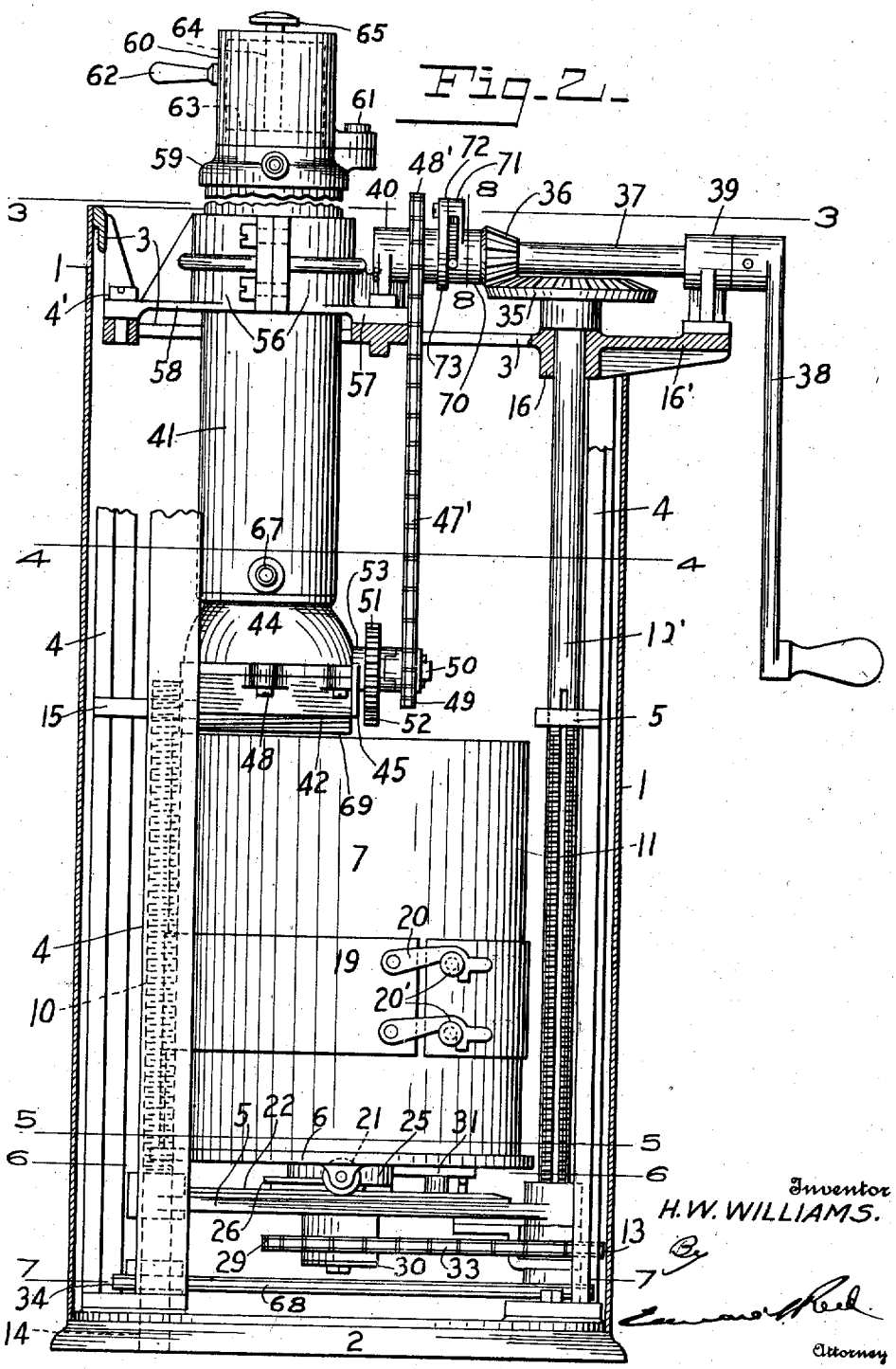

Jan. 9, 1923. H. W. WILLIAMS. Re. 15,527.

DISPENSING MACHINE.

ORIGINAL FILED APR. 26, 1921.

6 SHEETS—SHEET 3.

Inventor
H. W. WILLIAMS.

By Edward Reid
Attorney

Jan. 9, 1923. H. W. WILLIAMS. Re. 15,527.

DISPENSING MACHINE.

ORIGINAL FILED APR. 26, 1921. 6 SHEETS—SHEET 4.

Inventor
H. W. WILLIAMS.

By Edward Rice
Attorney

Jan. 9, 1923.

H. W. WILLIAMS.
DISPENSING MACHINE.
ORIGINAL FILED APR. 26, 1921.

Re. 15,527.

6 SHEETS—SHEET 5.

Inventor
H. W. WILLIAMS.

By Edward Red
Attorney

Jan. 9, 1923. Re. 15,527.
H. W. WILLIAMS.
DISPENSING MACHINE.
ORIGINAL FILED APR. 26, 1921.
6 SHEETS—SHEET 6.
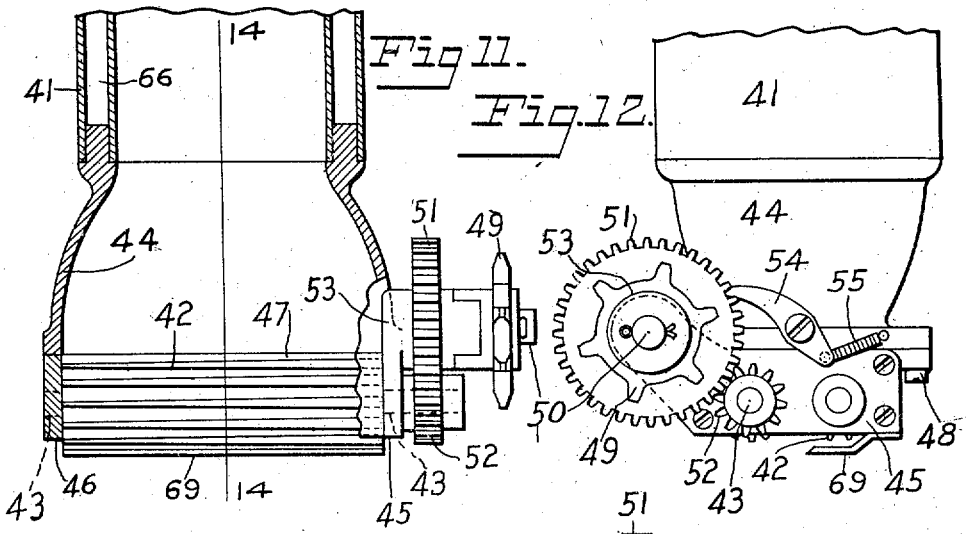
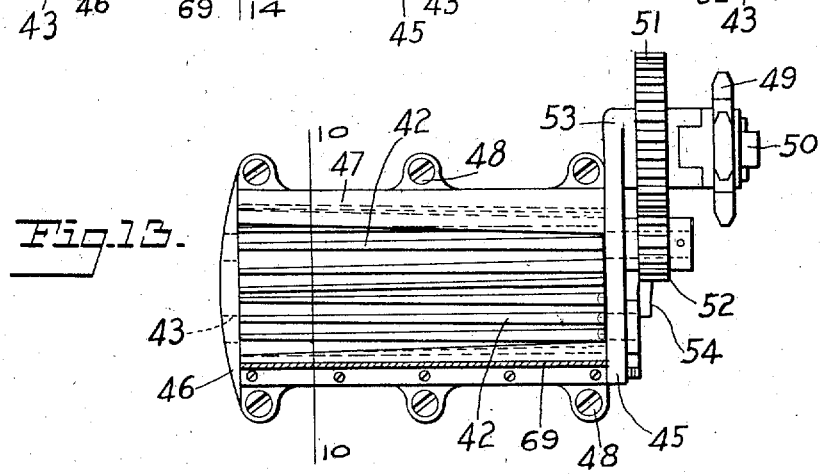
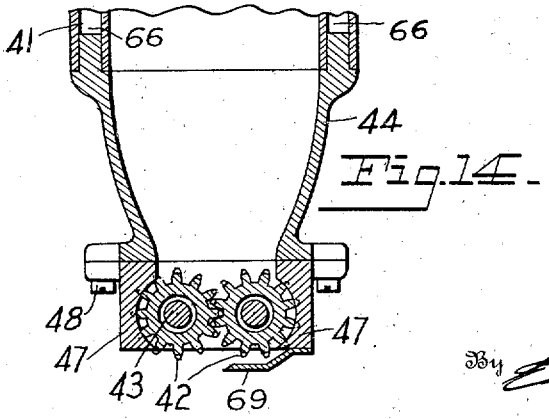
Inventor
H. W. WILLIAMS.
By Edward Reid
Attorney Reissued Jan. 9, 1923. Re. 15,527

UNITED STATES PATENT OFFICE.

HARRY W. WILLIAMS, OF DAYTON, OHIO, ASSIGNOR TO CHARLES F. GARDNER, OF DAYTON, OHIO.

DISPENSING MACHINE.

Original No. 1,375,947, dated April 26, 1921, Serial No. 363,940, filed March 8, 1920. Application for reissue filed July 23, 1921. Serial No. 487,177.

*To all whom it may concern:*

Be it known that I, HARRY W. WILLIAMS, a citizen of the United States, residing at Dayton, in the county of Montgomery and State of Ohio, have invented a new and useful Dispensing Machine, of which the following is a specification.

This invention relates to new and useful improvements in dispensing machines and while designed more particularly for dispensing plastic materials such as lard, lubricating greases, ice-cream, and the like, it may be employed for handling materials of various kinds.

The object of the invention is to provide an efficient machine of this character, which will expeditiously and accurately discharge commodities from the cans or packages in which they are packed, in measured quantities; and which will preserve the can or container, from which the commodities are removed, free from damage in order that the same may be again used.

Other objects and purposes are attained in the use of the mechanism hereinafter described in connection with the accompanying drawings, as will appear from the particular description in connection therewith.

Preceding a more particular description of the accompanying drawings reference in more general terms is made thereto.

Figure 1:
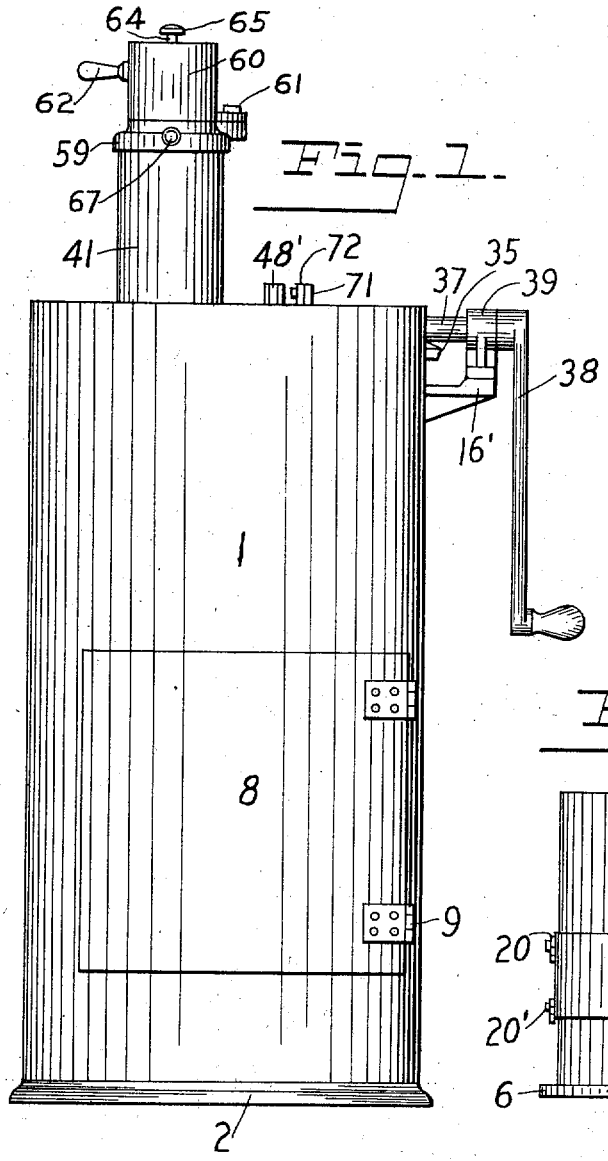
Figure 3:
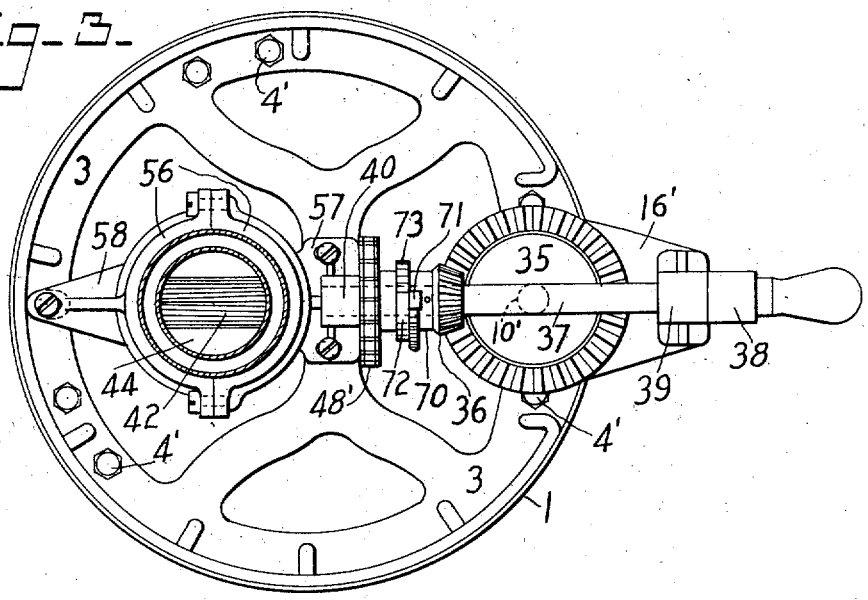
Figure 4:
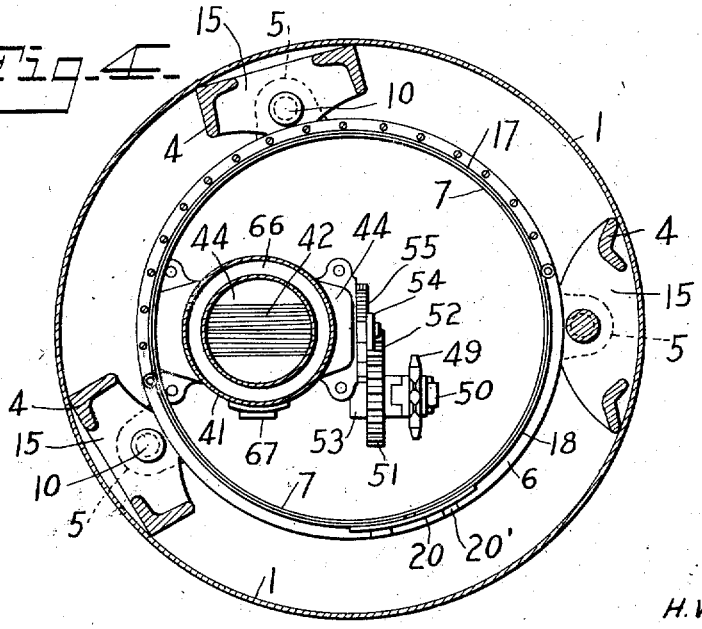
Figure 5:
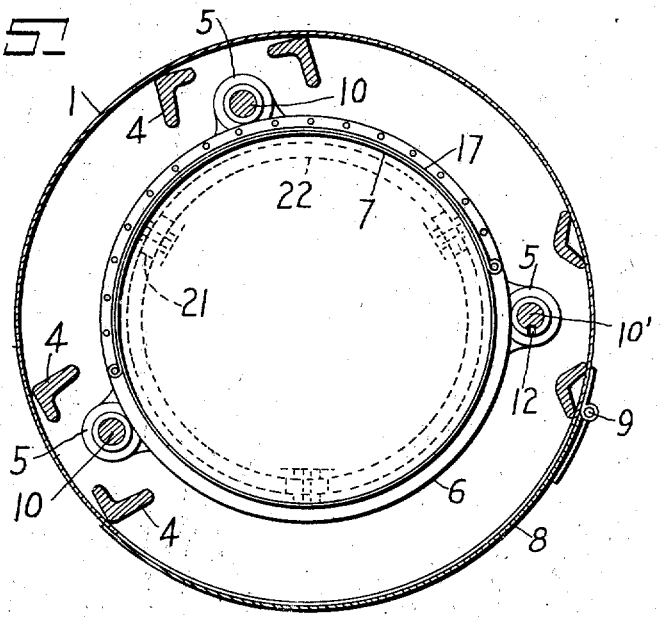
Figure 6:
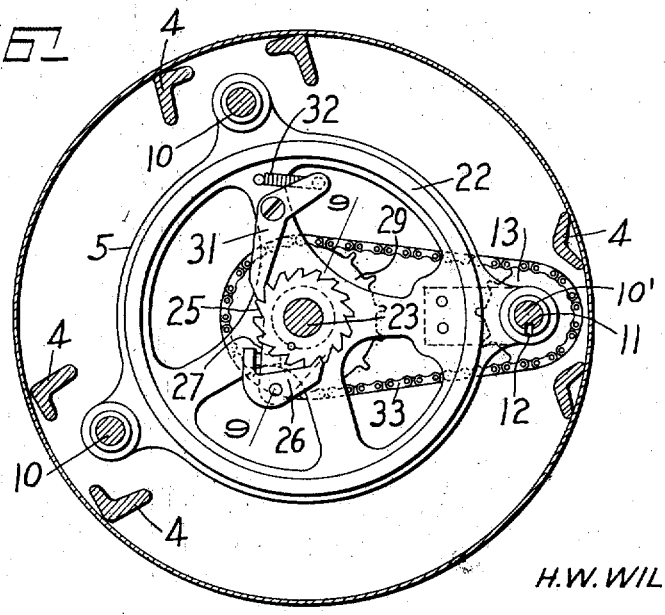
Figure 7:
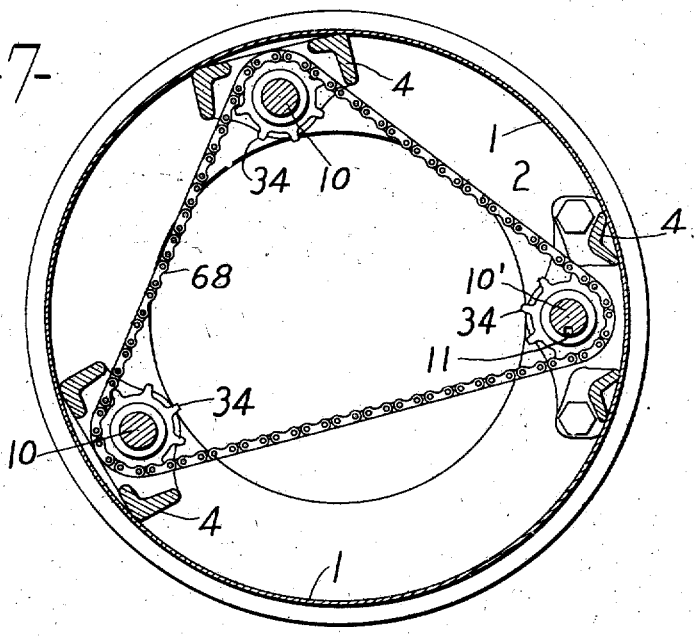
Figure 8:
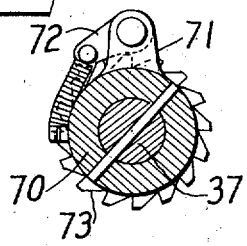
Figure 9:
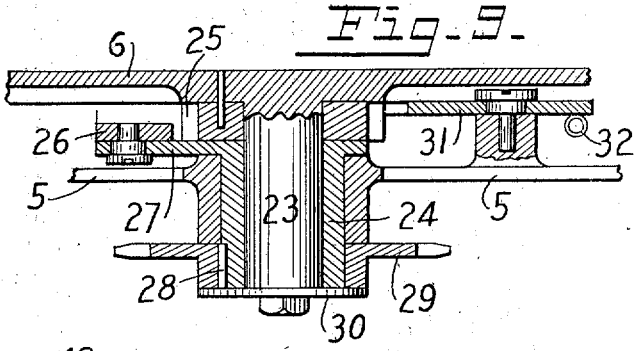
Figure 10:
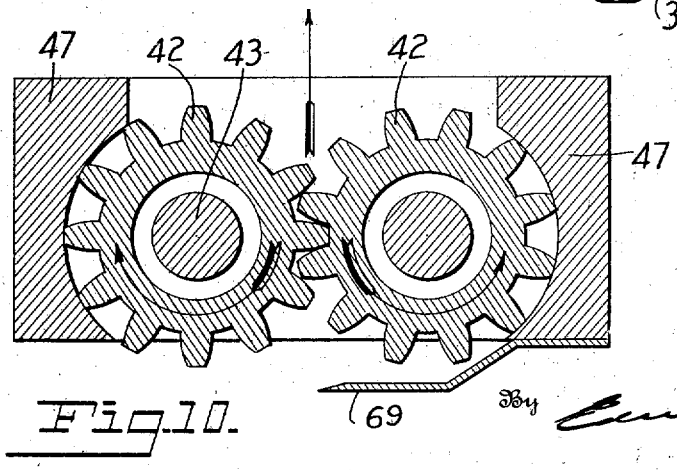

Fig. 1 is an elevation of my improved dispensing machine. Fig. 2 is a larger sectional elevation with the enclosing cylinder and the upper frame member appearing in section, and parts of the upright frame members broken off. Fig. 3 is a cross sectional view of the line 3—3 of Fig. 2. Fig. 4 is a cross sectional view on the line 4—4 of Fig. 2. Fig. 5 is a cross sectional view on the line 5—5 of Fig. 2. Fig. 6 is a cross sectional view on the line 6—6 of Fig. 2. Fig. 7 is a cross sectional view on the line 7—7 of Fig. 2. Fig. 8 is a sectional view on the line 8—8 of Fig. 2 showing the ratchet mechanism for driving the pump. Fig. 9 is a section on the line 9—9 of Fig. 6. Fig. 10 is an enlarged cross sectional view of the pump gears on the line 10—10 of Fig. 13. Fig. 11 is a sectional elevation of the bell end with part of the discharging tube, the pump members being also shown in elevation. Fig. 12 is an elevation at right angles to Fig. 11. Fig. 13 is a view of the pump members removed from the position shown in Figs. 11 and 12. Fig. 14 is a sectional view on the line 14—14 of Fig. 11, and Fig. 15 (Sheet 1) is an elevation of the can or container from which the commodity is removed, showing also the revolving platform upon which said can is supported and the clamp or holder for securing said can firmly on said platform.

In a more particular description of the invention, similar reference numerals indicate corresponding parts in the drawings and description.

In these drawings I have illustrated one embodiment of the machine and have shown the same as comprising means for supporting a container for the lard or other commodity, which is to be dispensed, and a discharge device arranged to extend into said container and remove the commodity therefrom. One of these parts is capable of vertical movement relatively to the other to maintain the discharge device in engagement with the commodity as the latter is discharged from the container. Further, in the present type of machine one of said parts is given a rotary movement relatively to the other to cause the discharge device to come in contact with different portions of the surface of the commodity. The commodity is discharged upwardly into a delivery cup which may be of such a character as to indicate the quantity, and, if desired, the price of the material, or commodity, delivered thereto. The delivery cup is no part of the present invention, being substantially the same as that shown and described in Letters Patent granted to William R. Mittendorf, 1,068,153, July 22, 1913.

In the particular machine here illustrated I have imparted both the rotary movement and the vertical movement to the container. This machine as shown in Figs. 1 and 2 of the drawings, comprises an inclosing cylinder 1 which is secured to a base plate 2 and an upper frame member 3. The said base plate 2 and the upper frame member 3 are connected by upright members 4 which are tightened by bolts 4′ and extend vertically, and the parts so connected constitute the frame work of the machine which provides suitable bearings and supports for the working parts thereof.

Mainly, these working parts consist of a support for the container comprising a lifting platform 5 and a revolving platform 6 which is supported upon platform 5. The revolving platform 6 directly supports the can or container 7 from which the commodity is discharged. It will be assumed that in the present instance the said can or container 7 contains lard as it comes from the packer. The same is placed in position on platform 6 in the machine, by opening the door 8 of the casing or cylinder 1, said door as shown in Fig. 1 having hinges 9. Each receptacle as emptied of its contents, is removed through said door and replaced by a new one.

The lifting platform 5 may be raised and lowered in any suitable manner and, as here shown, this is accomplished by the use of lifting screws 10 and 10′. One of these screws, to wit, 10′, is the main lifting screw and it has a spline 11 therein, in which a key 12 travels, said key projecting from the sprocket wheel 13 of the lifting platform 5. The lower ends of the said lifting screws have bearings 14 in the base plate 2 and the upper portions of said screws are provided with steady bearings 15 on the upright frame members 4, which, as before stated, unite the base plate 2 and the upper frame member 3. The main lifting screw 10′ extends upwardly and has a bearing 16 in an extended part 16′ of the said frame 3.

Figure 15:
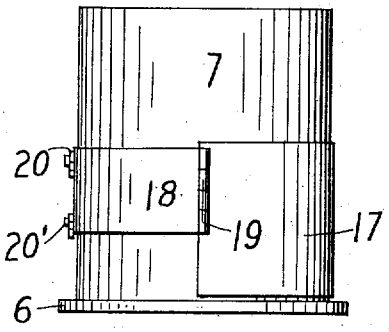

The container 1 is rigidly mounted upon the revolving platform 6, and, in the present instance, is clamped against a semi-circular chuck 17 that stands upright on said platform 6, and which is rigidly secured to said platform 6 or made a part thereof, as shown in Fig. 15. The inside or clamping surface of said chuck is slightly smaller than the average outside diameter of the can or container 7 and the clamping surface thereof may be corrugated or roughened in order to firmly hold the can or container in position when clamped. Straps or clamps 18 hinged at 19 to the chuck 17, are adapted to be tightened around the front of the can to clamp the same firmly against said chuck 17 by means of eccentric hooks 20 which are pivoted to one of said straps and hook over pins 20′ on the other, as shown in Fig. 2. It will be understood that any suitable means may be employed for holding the can or container 7 firmly on the revolving platform 6. The means above described are efficient and may be employed for this purpose.

The revolving platform 6 is provided with rollers 21 which travel on a track or circular raised portion 22 of the lifting platform 5.

As shown in Figs. 6 and 9, a pivot 23 projects downwardly from said revolving platform 6 within a sleeve 24 journaled in the platform 5. On the underside of said revolving platform 6, a ratchet wheel 25 is secured. A pawl 26 engages said ratchet wheel to rotate the platform 6, said pawl 26 being pivotally supported on a projection or arm 27 which extends from the upper end of the sleeve 24. The sleeve 24 is enclosed by the hub of the lifting platform 5 the circumference of which is provided with openings to receive the lifting screws before referred to. Attached to the sleeve 24 is a sprocket wheel 29 the hub of which is enclosed by a retaining plate 30 which is secured to the sleeve 24 by a key 28. The pawl 26 functions in connection with the ratchet wheel 25 when the can or container 7 is being elevated, to revolve said can, but, the said pawl 26 rides over the teeth of said ratchet wheel when the can or container is being lowered. During this period the ratchet wheel 26 remains stationary through the control of a holding pawl 31 pivoted to a part of the lifting platform 5 and held in engagement with said ratchet by a spring 32. The sprocket wheel 29 is driven by a chain 33 from the sprocket wheel 13, said sprocket wheel being heretofore referred to, and the same being driven by the main lifting screw 10′. The upper end of the said screw, which as before stated, has a bearing 16 in the upper frame member 3, has a bevel gear 35 fixed to it which meshes with a bevel pinion 36 on the main driving shaft 37. The shaft may be actuated in any suitable manner, but in the present machine it is operated manually from a crank handle 38. The main driving shaft 37 is provided with bearings 39 and 40 on the upper frame member 3, and from the foregoing description it will be seen that by rotating the shaft 37, the can, or container, 7 will be elevated by the lifting platform 5 through means of the lifting screws 10—10′ and revolved by platform 6 rotated through the means shown in Fig. 9 of the drawings.

Lifting screw 10′ has been referred to as the main lifting screw merely because it receives the power from shaft 37 and is made longer than the other two. The power is transmitted to the two other screws from a sprocket wheel 34 fixed to the lower end of said screw 10′, and similar sprocket wheels 34 fixed on screws 10, all of which wheels are connected by a sprocket chain 68.

During the simultaneous rotation and elevation of the can or container the lard or other commodity therein contained is removed from the mouth of the can by means which engages the lard and elevates it into a discharging tube 41. The discharging device by which the material is thus elevated or removed from the can, which is herein termed a pump, may take various forms and the form selected for the present machine is illustrated in detail on Sheet 6 of the drawings.

As there shown, it consists of two elongated toothed members 42 which are mounted upon shafts 43 having bearings in the end plates 45 and 46 attached to side plates 47, which parts, together with the said toothed members 42 may be said to constitute the pump. The united parts 45, 46 and 47 are attached by bolts 48 to the bell end 44 of the discharge tube 41. The ends only of said toothed members 42 are secured to their respective shafts, other portions of said gears being chambered out around the shafts, as shown in Fig. 10, to decrease weight. The lower end of the discharge tube 41 is supported upon the bell end 44 which may be in the form of a casting as may also the parts which house the toothed members 42. Projecting from one of the side plates 47 is a scraper or blade 69 which is made rigid thereto and scoops the lard into the space adjacent to the teeth of the members 42 as the can or container is rotated and elevated. From Fig. 2 it appears that the elongated toothed members 42, which constitute the pump as before stated, are of a length which extends approximately from the center of the can to the inner circumference thereof, so that when the can is rotated the entire contents thereof is engaged by the rotating toothed members. Owing to the increasing radius of the body of the lard or other commodity within said receptacle from the center to the circumference thereof, if provision were not made the pump or toothed members 42 would discharge the lard unequally, therefore, the said members are tapered outwardly from their inner ends by the said teeth being cut down to the pitch line at the center and gradually given their full length at their outer ends. The said elongated toothed members 42 are driven from the main driving shaft 37 through means of a sprocket chain 47′ which connects with a sprocket wheel 48′ loose on said shaft 37.

The bevel pinion 36 is integral with a sleeve 70 which is pinned to the shaft 37 (Fig. 8) and from said sleeve an arm 71 projects and supports a ratchet pawl 72. Loose on the shaft 37 is a ratchet wheel 73 that is engaged by said pawl and joined to said ratchet wheel is the upper sprocket wheel 48′ connected by the chain 47′ to a lower sprocket wheel 49 on a short shaft 50. The transmission gear 51, on the same axis with sprocket wheel 49 meshes with a pinion 52 on a projected end of one of the shafts of the elongated toothed memberes 42, as shown in Fig. 13. The shaft of the gear 51 is supported on an extended part 53 of the end plate 45 at the bell end 44 of the discharge tube.

It will be understood that in the elevation of the container 7 the contents thereof are removed by the pump as the same is elevated and that the operation may be continuous or intermittent. After the contents have been completely removed by the complete elevation of the container the lifting and revolving platforms, 5 and 6, and the container are lowered by a reverse movement of the main driving shaft 37. During this movement it is desirable that the pump members 42 remain stationary, and the revolving platform 6 shall remain stationary as to rotation. This is accomplished in reference to the platform 6 through means of the holding pawl 31, as shown in Fig. 6, and before referred to. The pump members 42 are prevented from rotating by means of a similar holding pawl 54 (Fig. 12), which is pivoted at the bell end 44 of the discharge tube and engages the teeth of the gear 51. This pawl is held in such engagement by a spring 55 as is also the pawl 31 by a spring of similar character. The reverse operation of the main driving shaft therefore, has no effect on the pump member, and the revolving platform other than to lower the latter.

The discharge tube including the bell end thereof is firmly supported in the position shown in Fig. 2 by a clamp consisting of two parts 56 which embrace the upper portion of the tube at the upper frame member 3. The said parts 56 are united by bolts as shown in Fig. 3, and have extensions 57 and 58 which are bolted to the upper frame member 3 and thereby made firm. The upper end of said discharge tube is fitted with a ring or open casting 59 above which is placed a delivery cup 60, said cup being hinged at 61 to the casting 59. The said cup occupies an inverted position and has a handle portion 62 by which it is moved on the hinge 61 to discharge the contents thereof after the desired quantity of lard or other commodity has been discharged therein through the discharge tube 41. On the interior of the said cup there is a plate 63 of equal diameter with the interior of the cup. This plate is shown in the lower position in dotted lines in Fig. 2 which indicates that the cup is empty. A plunger 64, also shown partly in dotted lines in Fig. 2 is secured to the center of the plate 63 and extends outwardly through an opening in the top of the cup, the extended end being provided with a head 65 that may be pressed by the hand in discharging the contents of the cup into a suitable receptacle such as may be desired to place the amount of measured material therein. The said measuring cup is such as that shown and described in the former patent hereinbefore referred to, and it is thought unnecessary to give any further description thereof. As the cup is shown in Fig. 2 it is immediately above the discharge end of the tube 41, and when the machine is operated by turning the crank handle 38 the lard or other commodity is forced up through the tube 41 and into the cup 60.

As the contents enter the cup it forces the plate 63 upwardly and therewith the plunger 64 until the requisite amount of the material is delivered to said cup. When this is done the cup is swung to one side by the handle 62 and the commodity received by the cup is discharged therefrom by pressing downwardly on the plunger 65. The tube 41 is provided with a surrounding cooling space or jacket 66 with openings 67 at the upper and lower ends thereof for an air or water pipe to communicate therewith.

While I have with some minuteness described the various structural features, it is to be understood that these may vary more or less within the knowledge of the skilled mechanic, without departing from the broad underlying principles of the invention.

The discharge device, or pump, may take various forms but I have found the gear pump herein shown and described to be well adapted for the removal of the contents of the container. By cutting down the addendum of the teeth from a full tooth on the left end of the gears to about the pitch line at the right end, one half of the volume of the material is removed during one revolution of the gears. The volume removed at each revolution and lifting of the container may be calculated so that the material may be fed to the gear pump in the ratio at which the pump will dispose of it.

The machine has been described in connection with a cylindrical form of container 7 in which lard is usually packed by the packing establishments. It is to be understood, however, that the machine is not limited to the handling of this form of container. Kegs in which lard is also packed may be put through the machine with like effect. In that case it would be necessary to change the position of the discharging tube 41 to accommodate the gear pump to the form of the keg. For example, the mounting of the said tube would necessarily have to be of a character that would permit of the pump being swung more or less outwardly from the perpendicular position shown in Fig. 2, to reach the outwardly rounded form of the keg.

In the case of cylindrical cans or containers of varying diameters, the discharge tube and gear pump may be adjusted laterally in a perpendicular position by means of the oblong openings in the clamp extensions 57 and 58, as seen in Fig. 3.

Having now fully described my invention what I claim as new and desire to secure by Letters Patent, is:

1. In an apparatus of the character described, a support for a container, discharge mechanism adapted to extend into said container and remove the material therefrom, and means for rotating one of said parts relative to the other, said discharge mechanism comprising a conduit and a device connected therewith to remove the material and discharge same through said conduit.

2. In an apparatus of the character described, a support for a container, discharge mechanism adapted to extend into said container and remove the material therefrom, and means for moving one of said parts vertically relative to the other, said discharge mechanism comprising a conduit and a device connected therewith to remove the material and discharge the same through said conduit.

3. In an apparatus of the character described, a support for a container, discharge mechanism adapted to extend into container and remove material therefrom, and means for rotating one of the parts relative to the other and moving one of said parts vertically relative to the other said discharge mechanism comprising a conduit and a device connected therewith to remove the material and discharge the same through said conduit.

4. In an apparatus of the character described, a support for a container, discharge mechanism adapted to extend into said container and remove the material therefrom, a means for simultaneously rotating one of said parts relative to the other and moving one of said parts vertically relative to the other, said discharge mechanism comprising a conduit and a device connected therewith to remove the material and discharge the same through said conduit.

5. In an apparatus of the character described, a rotatable support for a container, a discharge device adapted to extend into said container and remove semi-solid material therefrom, and means to rotate said support to bring different portions of said material into contact with said discharge device.

6. In an apparatus of the character described, a rotatable support for a container, and a discharge device adapted to extend into said container and remove the material therefrom, and means for moving one of said parts vertically relatively to the other, said discharge device comprising a conduit and a device connected therewith to remove the material and discharge the same through said conduit.

7. In an apparatus of the character described, a rotatable support for a container, and a discharge device adapted to extend into said container and remove the material therefrom, and means for moving said support vertically relatively to said discharge device.

8. In an apparatus of the character described, a support for a container, a discharge device adapted to extend into said container and remove the material therefrom, and means of rotating one of said parts relative to the other to bring said discharge device into operative relation to different parts of the surface of said material and for moving said support vertically relative to said device.

9. In an apparatus of the character described, a support for a container, a vertically arranged discharged tube mounted in line with said container, and a discharge device connected with the inner end of the said tube and adapted to enter said container, to remove material therefrom and discharge the same through said tube, and means to elevate said support as the material is discharged from the container.

10. In an apparatus of the character described, a support for a container, a vertically arranged discharge tube mounted in line with said container, and a discharge device connected with the inner end of the said tube and adapted to enter said container, to remove material therefrom and discharge same through said tube.

11. In an apparatus of the character described, a support for a container, a discharge tube mounted above said container, a discharge device connected with said tube and adapted to remove material from said container and discharge the same through said tube, means to elevate said support as the material is discharged from the container, and means to rotate the support for said container.

12. In an apparatus of the character described, a rotatable platform, an elevating platform upon which the rotatable platform, is supported, and a discharge device to remove the material from a container supported by said rotatable platform.

13. In an apparatus of the character described, a rotatable platform adapted to support a container, a discharge device engaging the material in said container as the latter is rotated, and a discharge tube supporting said discharge device, the support for said discharge tube being laterally adjustable.

14. In an apparatus of the character described, a support for a container, a discharge device adapted to extend into said container and remove the material therefrom, and means for rotating one of said parts relatively to the other, said discharge device being laterally adjustable relatively to said container.

15. In an apparatus of the character described, a rotatable platform to support a container from which the material is to be discharged, an elevating platform supporting said rotatable platform, lifting screws supporting said elevating platform, connections between one of said lifting screws and the rotatable platform for imparting rotatory movement to the latter, a discharge device adapted to extend into said container to remove the material therefrom, a discharge tube supporting said discharge device, and means for simultaneously actuating the elevating and rotatable platforms and said discharge device.

16. In a machine of the character described, a rotatable platform adapted to support a container from which material is discharged, and a gear pump engaging said material in the mouth of the container to remove the same as the container rotates with the platform.

17. In a machine of the character specified, a rotatable platform adapted to support a container from which material is discharged, and a pump comprising elongated gears arranged to engage the material to remove the same as the container rotates with the platform.

18. In a machine of the character specified, a rotatable platform adapted to support a container from which material is discharged, and a pump comprising elongated gears engaging said material to remove it as the container is rotated by said platform, the teeth of said gears being tapered longitudinally from approximately the pitch line at one end thereof to approximately a full tooth at the other end thereof.

19. In a machine of the character specified, a rotatable platform adapted to support a container from which material is discharged, a gear pump engaging the said material between the center of the container and the inner circumference thereof, and means for simultaneously rotating said platform and therewith the container and the gear members of said pump.

20. In a machine of the character specified, a rotatable platform adapted to support a container from which material is discharged, a discharge tube mounted above the container and a pump mounted on said discharge tube and comprising two elongated gears adapted to engage said material from approximately the center thereof to the inner circumference of the container, the teeth of said gears being tapered outwardly from the pitch line at the inner ends thereof.

21. In a machine of the character specified, a rotatable platform, an elevating platform upon which the rotatable platform is supported, and a gear pump adapted to remove the material from a container supported upon said rotatable platform as it is rotated and elevated by said platforms.

22. In a machine of the character specified, a rotatable platform adapted to support a container from which material is discharged, an elevating platform below said rotating platform, a discharge tube to receive said material, and a gear pump mounted between said discharge tube and the container for discharging the material into the discharge tube, said discharge tube and gear pump being adjustable relative to the container.

23. In a machine of the character specified, a rotatable platform adapted to support a container from which material is discharged, and a gear pump engaging said material between the center and the circumference thereof, the said rotatable platform and the pump having a relative vertical movement whereby the said material is progressively penetrated throughout its depth by the pump.

24. In a machine of the character specified, a rotatable platform adapted to support a container from which material is discharged, an elevating platform supporting said rotatable platform, lifting screws supporting said elevating platform, connections between one of said lifting screws and the rotatable platform for imparting rotary movement thereto, a pump engaging the surface of said material from the center to the circumference thereof, said pump comprising two elongated and longitudinally tapered gears, a discharge tube supporting said gears, and means for simultaneously actuating the elevating and rotatable platforms and actuating said pump.

25. In a machine of the character specified, a rotatable platform adapted to support a container from which material is discharged, an elevating platform supporting said rotatable platform, lifting screws engaging the elevating platform at its circumference, connections between one of said lifting screws and the center of the rotatable platform whereby said platforms are simultaneously actuated, a gear pump comprising two elongated tapered gears engaging the material in said container, a discharge tube receiving the material from said pump, and a delivery cup receiving the material from said discharge tube.

26. In a machine of the character specified, a rotatable platform adapted to support a container, a pump engaging the material in said container from the center to the circumference thereof as the container is rotated, a discharge tube supporting said pump, the support of said discharge tube being adjustable horizontally, and means for simultaneously actuating the rotatable platform and the pump.

27. In an apparatus of the character described, a support for a container, a gear pump adapted to extend into said container and remove the material therefrom, and means for imparting vertical movement to one of said parts relatively to the other.

28. In an apparatus of the character described, a support for a container, a discharge device comprising a tube and a gear pump arranged at the inner end of said tube and adapted to extend into said container, and means for imparting vertical movement to one of said parts relatively to the other.

29. In an apparatus of the character described, a support for a container, a discharge device comprising a tube and a gear pump arranged at the inner end of said tube and adapted to extend into said container, and means for rotating one of said parts relatively to the other, and for imparting vertical movement to one of said parts relatively to the other.

In testimony whereof I affix my signature hereto.

HARRY W. WILLIAMS.